US010037252B2

(12) United States Patent
Rabinovich et al.

(10) Patent No.: US 10,037,252 B2
(45) **Date of Patent: *Jul. 31, 2018**

(54) REDUCING INPUT/OUTPUT (I/O) OPERATIONS FOR CENTRALIZED BACKUP AND STORAGE

(71) Applicant: VMware, Inc., Palo Alto, CA (US)

(72) Inventors: Dmitry Rabinovich, Herzliya (IL); Meytal Genah, Herzliya (IL); Anton Gartsbein, Herzliya (IL)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/582,890

(22) Filed: May 1, 2017

(65) Prior Publication Data

US 2017/0235651 A1 Aug. 17, 2017

Related U.S. Application Data

(63) Continuation of application No. 14/583,477, filed on Dec. 26, 2014, now Pat. No. 9,639,433.

(51) Int. Cl.
*G06F 11/14* (2006.01)

(52) U.S. Cl.
CPC ...... *G06F 11/1469* (2013.01); *G06F 11/1464* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 9,442,807 | B1 * | 9/2016 | Zhang | G06F 17/30159 |
| 2007/0266062 | A1 | 11/2007 | Young | |
| 2013/0054540 | A1 * | 2/2013 | Factor | G06F 17/30159 707/692 |
| 2013/0227237 | A1 * | 8/2013 | Tashiro | G06F 3/0608 711/170 |
| 2014/0181034 | A1 | 6/2014 | Harrison | |
| 2014/0181579 | A1 | 6/2014 | Whitehead | |
| 2014/0325507 | A1 * | 10/2014 | Freimuth | G06F 9/45558 718/1 |

* cited by examiner

*Primary Examiner* — Edward J Dudek, Jr.
*Assistant Examiner* — Ralph A Verderamo, III

(57) ABSTRACT

Techniques are described for reducing I/O operations and storage capacity requirements for centralized backup storage systems. A central server optimizes the collection and centralization of backup data from a number of endpoint devices for backup purposes. The central server utilizes a single instance store and a persistent files cache to minimize the number of backup copies for each non-unique file, reduce storage usage, network traffic, memory footprint and CPU cycles required to identify and process non-unique data. For each file in the single instance store, the server tracks the source device of that file until a threshold number of devices have been reached. Once the file reaches the threshold number of sources, the file is marked as persistent and its hash value is placed in the persistent files cache. Thereafter, all pointer creation and reference counting for that file cease.

20 Claims, 5 Drawing Sheets

REDUCING INPUT/OUTPUT (I/O) OPERATIONS FOR CENTRALIZED BACKUP AND STORAGE

CLAIM OF PRIORITY

This application is a continuation of U.S. patent application Ser. No. 14/583,477, filed on Dec. 26, 2014, Dmitry Rabinovich, et al., entitled "REDUCING INPUT/OUTPUT (I/O) OPERATIONS FOR CENTRALIZED BACKUP AND STORAGE," which corresponds to U.S. Pat. No. 9,639,433 issuing on May 2, 2017, and the entirety of which is incorporated by reference herein.

TECHNICAL FIELD

The present disclosure generally relates to centralized storage and backup techniques in computing environments and more particularly relates to reducing storage size and input/output (I/O) operation requirements for centralized backup of data.

BACKGROUND

Enterprise desktop management is one of the most challenging tasks for Information Technology (IT) departments of large organizations today. A typical IT department needs to manage, protect, and distribute software updates and modifications, upgrade operating systems and applications, as well as be able to back up and restore the user's data, applications and settings on demand. One significant issue for IT departments involves the complexity of managing a large number of different desktop instances that exist on the computers of various enterprise users. The sheer number of computers to manage; the proliferation of operating system (OS) images and applications; and the complex set of operations, such as deployment, provisioning, patching, upgrading, installing and managing applications, performing backup and restore operations, compliance testing, troubleshooting and re-imaging; all make IT responsibilities a very challenging task. To compound these difficulties, today's enterprises are often dispersed over multiple geographic locations and the use of Local Area Networks (LANs) connected over one or more Wide Area Networks (WANs) with variable bandwidths and latencies is a serious barrier to providing efficient desktop management without sacrificing end user experience.

There exist a number of centralized backup and recovery solutions that are often utilized by IT departments of large organizations. These centralized backup solutions typically include functions for copying and archiving computer data so that it may be used to restore the original data after a loss event. For example, some backup software running on each end user's computer may periodically backup that user's data (e.g., documents, images, emails, etc.) to a central storage location, which may itself be replicated. If a user's computer subsequently breaks or malfunctions, the user's data could then be retrieved from the central storage location and provided to the user on a new or repaired device.

While these backup and recovery solutions have helped IT departments manage employee data, a number of inefficiencies remain in this space. For example, the storage capacity requirements for backing up all data of a large numbers of users can be substantial and it would be desirable to reduce those requirements. In most cases, not all of the data on each individual device is one hundred percent unique when compared to data of other users. For example, many devices may contain the same system files of common operating systems and/or certain applications. As such, it would not be efficient to duplicate such common files in central storage. Moreover, the input/output (I/O) operations for maintaining the backup data synchronized across numerous devices can significantly affect performance and it would be efficient to reduce such I/O operations for centralized backup storage systems.

DETAILED DESCRIPTION

Figure 1:
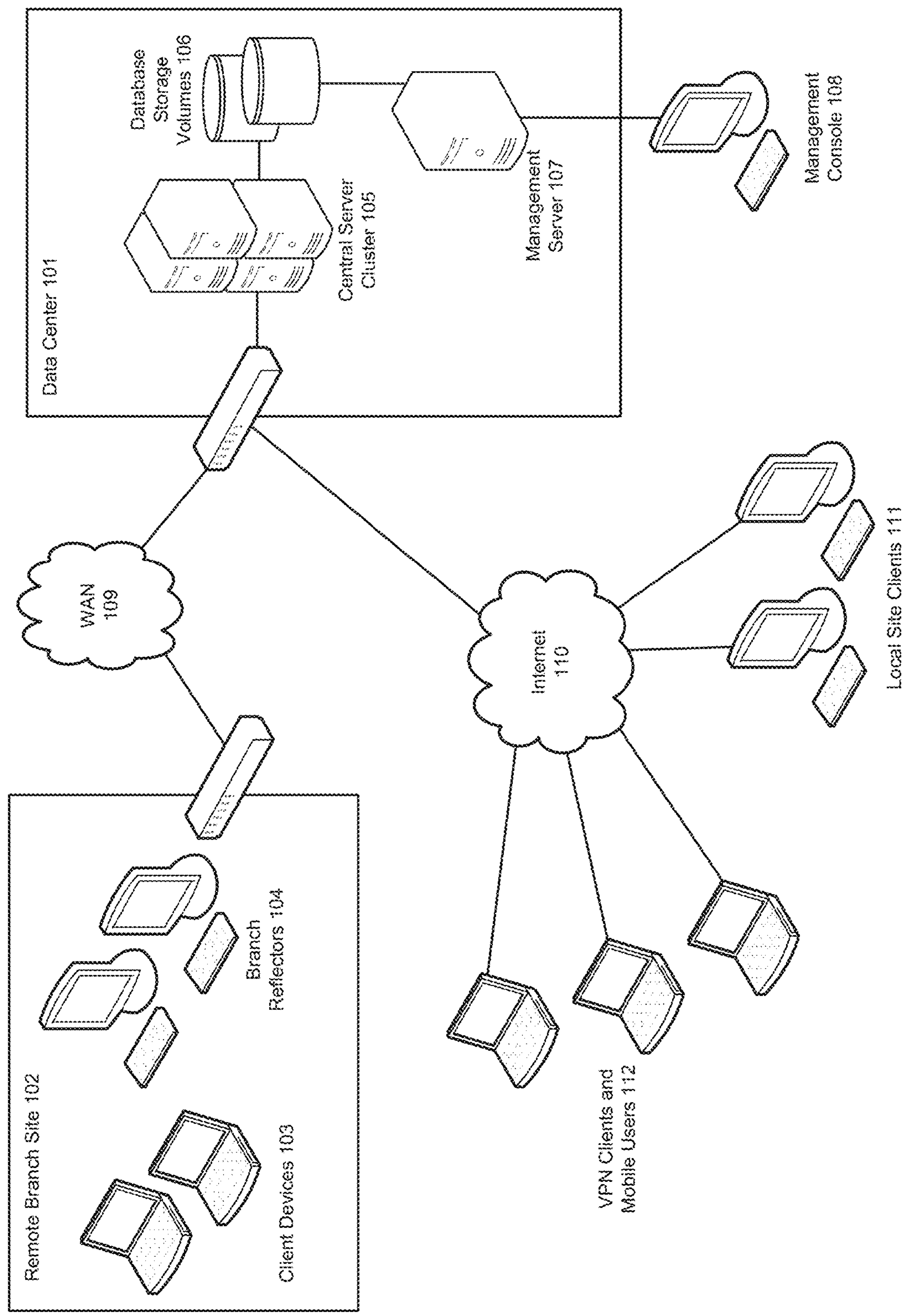
FIG. 1 illustrates an example of a centralized backup and storage system, in accordance with various embodiments.

Systems and methods in accordance with various embodiments of the present disclosure provide more efficient ways to reduce I/O operations and storage capacity requirements for centralized backup storage systems. In particular, embodiments described herein utilize a central server that optimizes the collection and centralization of backup data from a number of endpoint devices for backup and other purposes. The central server strives to minimize the number of backup copies for each non-unique file, reduce storage usage, network traffic, memory footprint and CPU cycles required to identify and process non-unique data.

In order to backup the data of numerous endpoint devices, the central server first collects from each endpoint device, a manifest that contains metadata identifying the listing of all files and directories on its respective endpoint device which are to be uploaded to the central server. Each file's metadata in the manifest may be comprised of the file size, attributes data hash-value and the like. Once the server receives the manifest, it processes the manifest in order to construct a similar structured manifest file, containing only the metadata for the subset of files which are not readily available on the central server (e.g., those files which the server has not already received from other devices). The server then returns this manifest to the endpoint device and the endpoint device uploads the needed data (i.e., uploads the files indicated in the manifest) to the server for backup. This initial process is referred to herein as the centralization process.

In order to reduce the storage capacity and I/O requirements, the server performs a number of optimizations. To begin with, all files are stored in a single instance store (SIS) such that only a single copy of each unique file will be stored in the SIS. When the server receives a manifest from an endpoint device, the server first determines whether the file is already available in the single instance store on the server. If the file is not available, the server requests the file from the endpoint device, such as by marking the manifest to reflect the missing file. If the file is already present on the single instance store, the server checks whether the file has been marked as persistent. Files are marked as "persistent"

once the server determines that a threshold number of endpoint devices (e.g., 4 devices or more) contain that file (i.e., are the "sources" of that file). Whenever a file has been marked as persistent, the file's hash value will be placed in a persistent files cache and the server will store an indication that the file is not to be deleted (or is at least restricted from being deleted).

Accordingly, when the server determines that a file in the client's manifest has been marked as persistent, no further action is necessary and the server may go on to the next file in the manifest because the persistent file is certain to be available on the server going forward.

On the other hand, if file is available on the server but the file has not been marked as persistent, the server needs to track the number of source devices that actually contain that file. To do so, the server stores an indication that this particular endpoint device is a source of the file. There may be multiple sources of the file and the server tracks which endpoint devices are the sources and how many sources the file is associated with. Once the number of sources for a file in the single instance store has crossed the predetermined threshold (e.g., 4 devices or some other threshold), the file will be marked as being persistent.

FIG. 1 illustrates an example of a centralized backup and storage system, in accordance with various embodiments. As illustrated in this example, the system can be used to provide centralized image management with disaster recovery capabilities. For each endpoint device, the central server stores the entire endpoint image in the data center 101 for management and data replication purposes, and also maintains a number of historical point-in-time snapshots of the system based on configured intervals. The deployment of the backup system in the data center 101 may comprised of a management server 107, including a management console 108 that can be accessed by an administrator, a central server cluster 105, and the database and storage volumes 106 that can be used to store a repository of desktop snapshots and image repository, as well as any metadata used for management purposes.

In various embodiments, an agent application and driver are installed on every endpoint device (i.e., client device), including devices at each remote branch site 102, on local site clients 111, and any VPN or mobile clients 112 that might be connected over the Internet 110. The agent generally operates in the background on a client device while the end user is free to use their device. While operating in the background, the agent can perform a number of functions, including backing up an image of all the data of the device to the central server 105 and allowing the central server 105 to distribute any software updates or modifications to the device.

When performing an initial backup, the agent is first installed on a client device and performs the centralization process by scanning the contents of the local file system in the client device and uploading any missing files (i.e., files which are not already available on the central server) to the central server 105. This process can be done by exchanging manifests, as previously mentioned. Once the centralization process is complete, the central server 105 contains a full image of the user's desktop, including the operating system, applications and user data, all of which can be used to restore the user's device or to make a copy of the device during any data loss events. The central server 105 is responsible for storing the images of all endpoints (i.e., client devices) and for providing an administrator with a management console 108 to manage the various operations (e.g., updates, new software deployments, etc.) on the client devices. The central server 105 stores all the desktop images in a single instance store (SIS) in an efficient manner, using deduplication of the same files or blocks. This helps optimize the storage space and network communications.

Once the initial centralization process is complete, the agent can periodically synchronize with the central server any ongoing changes that the user may make to their device. The backup system described herein can optimize both the initial process of centralization and the on-going synchronization of endpoint images. Both the network and storage resources can be optimized. For example, one of the methods to optimize network bandwidth is by file-level deduplication. Many copies of the same file, identified by the same unique signature, across different devices, will only be uploaded only once to the central server 105. The same optimization applies for familiar intra-file data chunks (e.g., blocks, pages, etc.). Redundant data chunks transfer is eliminated, by using server-side chunk caching. The cache entries may be evicted, when the cache reaches a certain size limit, based on chunk popularity measurement. Also, chunk transfer can be eliminated when a previous snapshot of the same file contains similar data chunks (intra-file chunk-level optimization). In addition, data chucks can be compressed using a compression algorithm before being sent over the wire.

Each client device can have a centrally managed policy, which defines which files are to be centralized and on-going synchronized. In one embodiment, in order to optimize the centralization process, the client device prepares a manifest containing metadata that identifies the list of all image files and their corresponding unique signatures, and sends the manifest to the server. The server replies with its own similarly structured manifest identifying only a subset of that list, with all file signatures which are not yet familiar (i.e., the file signatures of files which the server does not have a copy of). For each unfamiliar file signature, the endpoint sends a list of intra-file data chunk unique signatures. The server replies with a subset of that list, with all data chunk signatures which are not yet familiar. Then, for each already familiar data chunk signature, the server copies and places it into the matching location, inside the centralized image file. For each unfamiliar data chunk signature, the client device sends the content of that chunk to the server. The chunk can be sent compressed (e.g., using LZ compression algorithm) and the server decompresses and places it into the matching location in the file.

As mentioned above, the agent can also enable an administrator to use the management console 108 to distribute any changes or software updates to the device. When an administrator initiates such an update, the server 105 can distribute any changes to the agent and the agent can perform the changes to the device in the background while the user is using their device. In various embodiments, some endpoint devices can be designated to be branch reflectors (BRs) 104, which are used to reduce the wide area network (WAN) 109 bandwidth requirements for image updates by sending the image update only once from the central server 105 to the BR 104 and then propagating the update locally over local area network (LAN) to the other client devices 103 in the branch site 102.

It should be noted that, as used throughout this disclosure, the terms "endpoint device" and "client device" are often used interchangeably to mean any computing device having processors and memory and capable of executing various applications, operating systems or the like. In at least some embodiments, the client device can alternatively be a virtual machine that is executed on a host computing device by utilizing a hypervisor, virtual machine manager (VMM) or other virtualization software. In such virtualized embodiments, the agent can be downloaded and installed on a virtual machine or by simply adding the agent to a template for a virtual machine.

Figure 2:
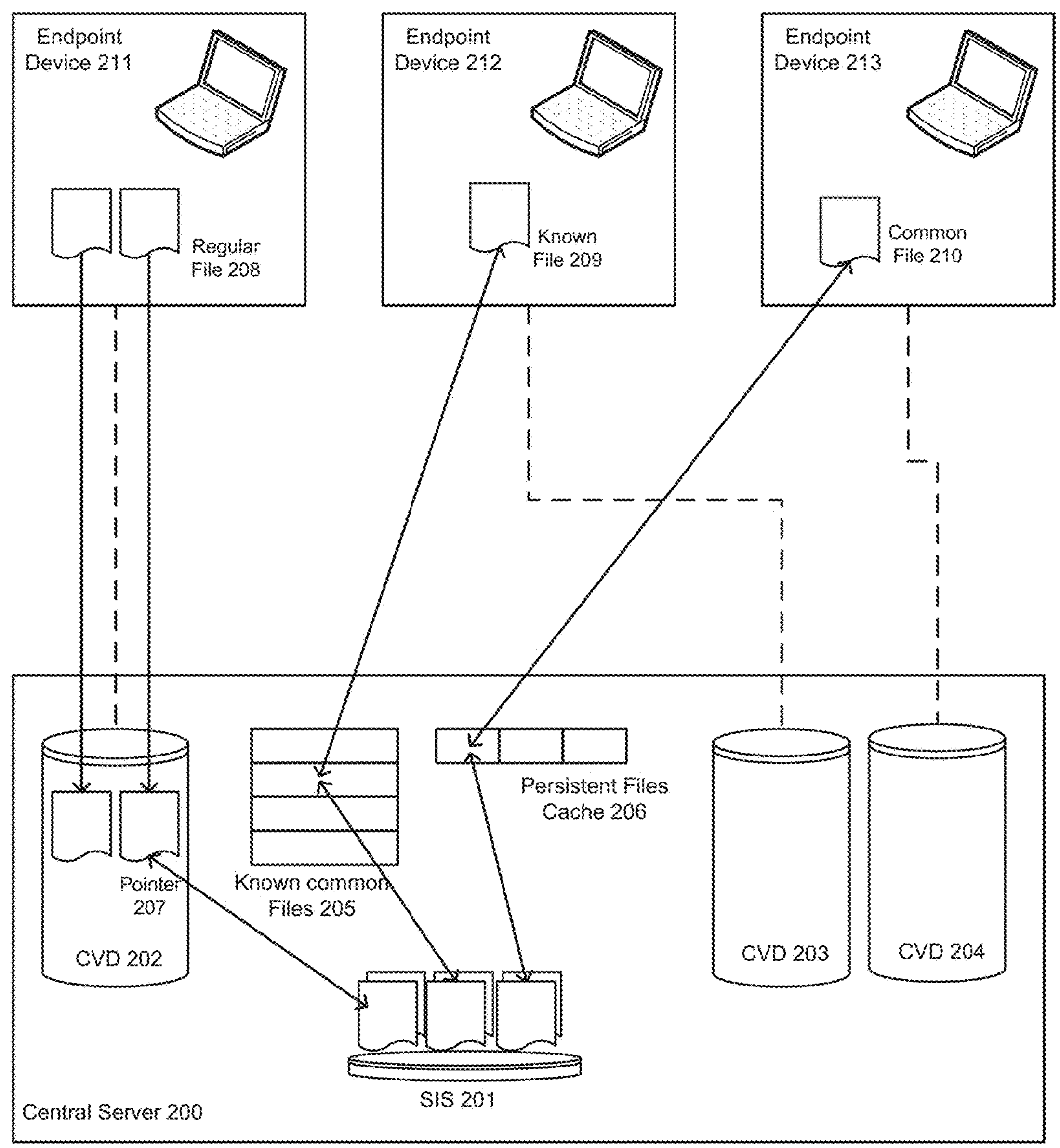
FIG. 2 illustrates an example of a system that reduces I/O operations for backup storage by utilizing a persistent files cache, in accordance with various embodiments.

FIG. 2 illustrates an example of a system that reduces I/O operations for backup storage by utilizing a persistent files cache, in accordance with various embodiments. As illustrated, the system is comprised of a plurality of endpoint devices (211, 212, 213) that upload their data to a central server 200 in the data center. Initial centralization is performed by exchanging of manifests between the server 200 and each individual endpoint device (211, 212, 213), as previously described. Each endpoint device first transmits its own original manifest to the central server. This original manifest is a serialized data structure carrying all of the information that is needed to recreate the exact directory structure of the end user's machine and to ensure data-integrity of all the files that are backed up on it (e.g., according to an assigned backup policy). The server processes the received manifest and then generates and returns its own manifest to the endpoint device. This returned manifest is the subset of the original data structure, containing only the information that is missing in the data center, i.e., the information that has not yet been uploaded by other endpoint devices. In one embodiment, each manifest is a set of elements, where each element is an abstraction of endpoint machine's file/directory. Each such element is referred to herein as a node in the manifest. The node contains a path, size, data hash value and metadata hash value. Hash values can be calculated using MD5 hash function, for example, and due to hash function properties, the system can identify duplicate data without the need to compare each pair of files.

Once the endpoint device receives the manifest returned by the server, it can upload all of the data necessary to create its own centralized virtual disk (CVD) (202, 203, 204) on the server. A CVD (e.g., 202, 203, 204) is associated with an endpoint device and represents the complete contents of the endpoint device, including the operating system image, applications, drivers, user-installed applications and machine state, unique identifier, hostname, any configuration changes to the machine registry, DLLs, configuration files and the like. This data is migrated to the central server and becomes the authoritative copy of the contents of each endpoint device. An administrator can use the CVD to centrally manage, update, patch, back up, troubleshoot, restore, and audit the end user's desktop, regardless of whether the endpoint is connected to the network or not.

Files uploaded to the data center can be stored in a single instance store (SIS) 201, where only a single copy for each file, having a specific hash-value resides. In at least some embodiments, only files larger than a predetermined size threshold may be stored in the SIS 201. For example, only files larger than 1 KB may be placed into the SIS 201. Smaller files under this threshold size may be considered to occupy too little storage space overall to incur the management of files in the SIS, as will be discussed below.

To be able and remove files which are no longer needed from the SIS 201, the server can use a reference counting technique. Using this technique, the server can store a pointer 207 in the CVD for each copy of file in the SIS 201. For example, if several CVDs contain the same copy of the file, the server can simply store the file into the SIS 201 and create a pointer in each CVD that needs that file. When the file is deleted, the respective pointer is deleted from the CVD. This ensures data-integrity, as the actual representative of the file is not deleted from SIS 201 until the very last referencing pointer is deleted.

Managing such reference counting for each individual file can incur significant computing costs, especially during the initial centralization process when numerous endpoint devices (211, 212, 213) are uploading data and files to the central server. For example, to create and/or delete a pointer, a number of I/O operations need to be executed by the central server. In some cases, pointers are also involved in a complex inter-server reference counting mechanism, such as in deployments where the server is clustered for example. Moreover, managing pointers in this manner creates large numbers of inodes in storage and the system may reach a shortage of inodes, particularly in large endpoint device deployments. It is therefore desirable to reduce the computing costs involved in the reference counting and pointer creation for files in the single instance store 201, as discussed below.

There exist some files, which will likely never be removed from the data center, as they are common enough and shared by at least a few endpoint devices. Because these files will never be removed, some valuable I/O can be saved which would otherwise be thrown for those files on reference accounting and pointer creation. In a typical deployment, the majority of files are present on only one device (or very few devices, e.g., less than some low threshold) and these files are referred to herein as "unique" files. Other files are located on large numbers of devices (e.g., more than twenty machines or some other high threshold)—those are identified as "very common" files or "known" files. These files are typically system files of an operating system or some other popular application files. The threshold to mark a persistent file can be set somewhere between the low threshold and the high threshold above. For example, if unique files are those which are present on less than 2 devices and if very common files are those which are present on more than 20 devices, the threshold to mark a file as "persistent" can be set to 4 devices. In that case, any file that is present on 4 or more devices will be identified and marked as persistent and its hash value will be placed in the persistent files cache 206. In some embodiments, if the file is just copied few times on the same machine, it is not counted and not marked as being persistent. For file to become persistent it should come from at least 4 different sources (or some other threshold). Additionally, for certain files which are very well known, such as operating system files or files of very popular applications (e.g., Word, Excel, etc.), the hash value of such files can be pre-computed and placed into another table in memory, i.e., the known common files table 205. This way, such known files can be identified immediately upon the first copy arrival to the data center. In other alternative embodiments, the hash values of such known files may be pre-populated into the persistent files cache 206.

Once a file has been marked as persistent, the server can discontinue maintaining the reference counting and pointer creation, thereby saving a substantial amount of I/O operations and inodes in the system. Thus, when the server receives the manifest from the client, it processes the manifest and checks whether the hash value of the file in the manifest is in the persistent files cache. If the file is present in the persistent files cache, the node in the manifest is marked to indicate that no data is required from the endpoint device. No pointer is created by the server and no reference count on the SIS representative is made. This saves all the I/O that would normally need to be made.

In the case where the file with the provided hash value exists in the SIS but is not in the persistent files cache, the endpoint device's context (identity) is stored along with the file. In one embodiment, this information can be marked in the header of the file in the SIS, as will be shown with reference to FIG. 3 below. In the event that the number of endpoint device contexts (identities) in the file reaches the predetermined threshold (e.g., at least 4 devices), the file is marked as persistent and its hash value is pushed into the persistent files cache, which is maintained in-memory. Thereafter, the server will not perform any further file system operations on the SIS representative and will not create any pointer files. The persistent files cache is also backed up to persistent storage (e.g., disk or SSD) so that the information about the file persistency is not lost upon system restart.

Figure 3:
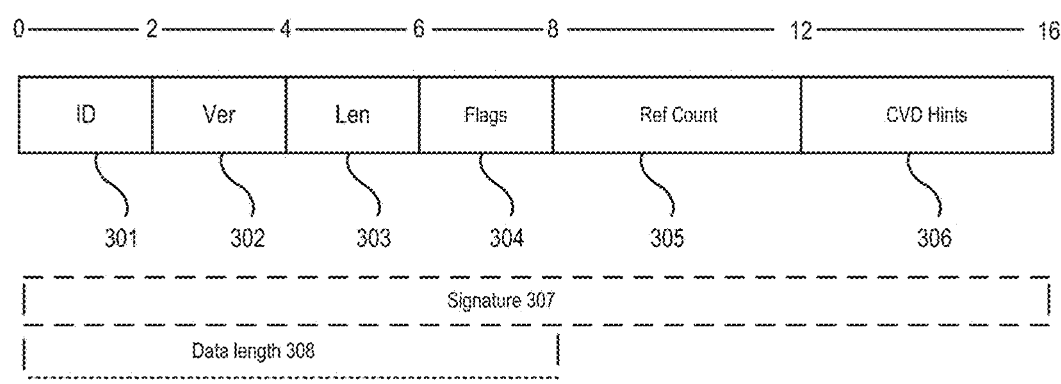
FIG. 3 illustrates an example of the structure of file header for a file in the single instance store, in accordance with various embodiments.

FIG. 3 illustrates an example of the structure of file header for a file in the single instance store, in accordance with various embodiments. In this example, the header is 8 bytes long. The ID 301 field is 2 bytes long and contains the identifier that identifies the file in the single instance store. The Ver 302 field is two bytes long and indicates the current SIS header version. The Len 303 field is two bytes long indicates the SIS header's length. The Flags 304 field is two bytes long and indicates the files flags, such as whether the file has pointers associated with it. The Ref Count 305 field is 4 bytes long and indicates the number of references to this file. The CVD hints field 306 is 4 bytes long and contains a modulo of CVD identifiers which contain the file. The Signature 307 is the file's MD5 signature which is 16 bytes long. Finally, the Data Len 308 is the length of the file's data and is 8 bytes long.

Figure 4:
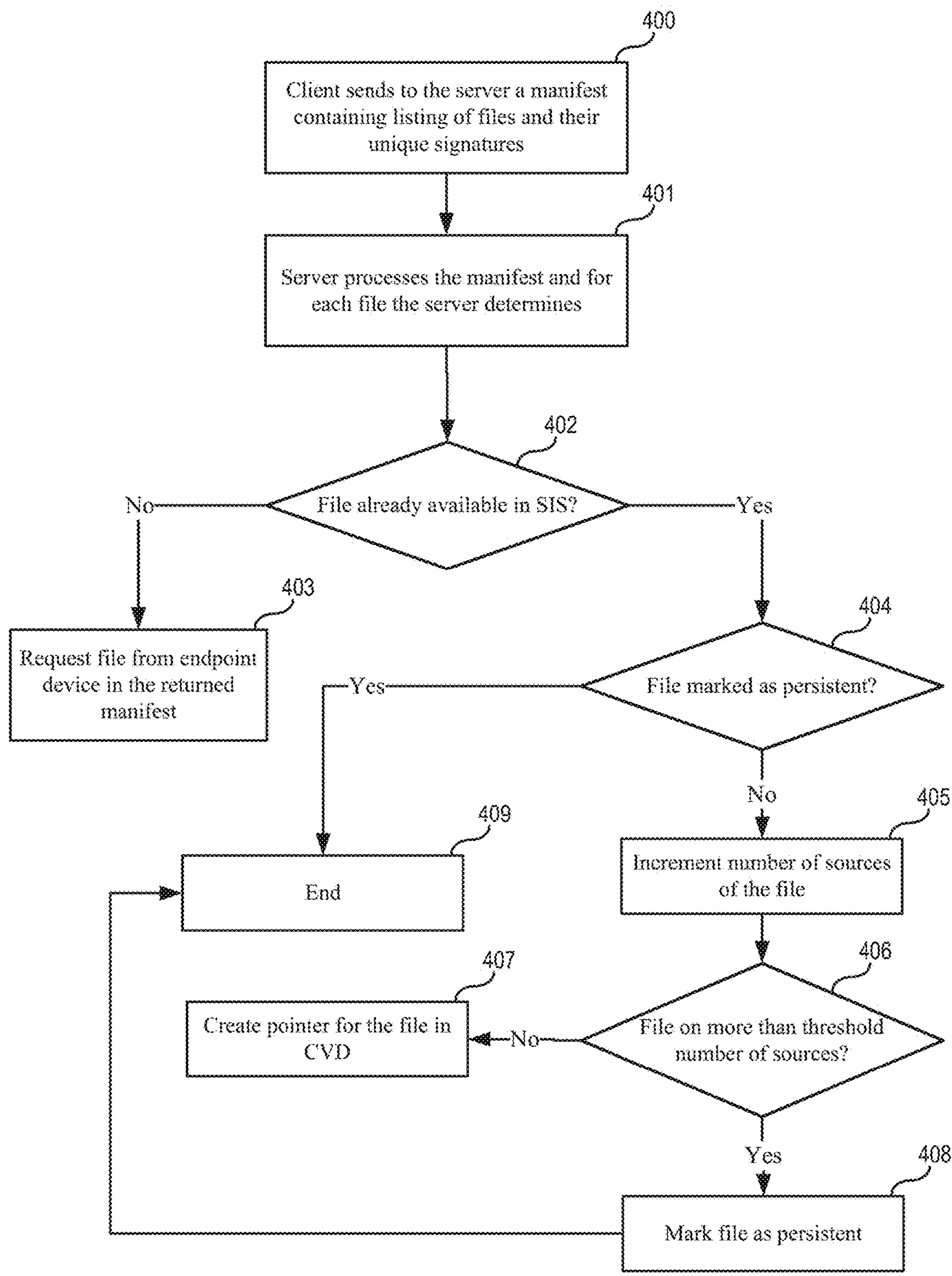
FIG. 4 illustrates an example of a process for reducing the number of I/O operations for central backup storage systems, in accordance with various embodiments.

FIG. 4 illustrates an example of a process for reducing the number of I/O operations for central backup storage systems, in accordance with various embodiments. In operation 400, the endpoint device transmits to the server a manifest that identifies a listing of files and directories located on the endpoint device. In operation 401, for each received manifest, the server processes the manifest to determine which files need to be uploaded from the endpoint device to the central server in order to construct a full image of the endpoint device on the central server. For each file identified in the manifest received from an endpoint device, the server determines whether the file is available in the single instance store or another location in the data center, as shown in operation 402. If the file is not available, the server requests the file from the endpoint device by marking an appropriate indication in the manifest that is returned to the endpoint device, as shown in operation 403.

If the file is available in the single instance store, the server then determines whether the file has been marked as persistent, as shown in operation 404. If the file has been marked as persistent, the server does not create any pointers or perform any reference counting and the process ends with respect to that file, as shown in operation 409.

If the file is available in the single instance store but it has not been marked as persistent, the server stores an indication that the endpoint device from which the manifest was received is a source of the file, as shown in operation 405. For example, the server increments the number of source endpoint devices in the SIS file header. Once the number of source devices has been incremented, the server determines whether the file resides on at least a threshold number of source endpoint devices in operation 406. If the file is on the requisite number of source endpoint devices, the server marks the file as persistent, as shown in operation 408. Once the file has been marked as persistent, its hash value is placed into the persistent files cache and thereafter, no pointers will be create and no reference counting will be maintained by the server and the process can proceed to operation 409. If, on the other hand, the file is not resident on the requisite threshold number of source endpoint devices, the server can create the appropriate pointers and maintain the reference count for the file, as shown in operation 407.

Figure 5:
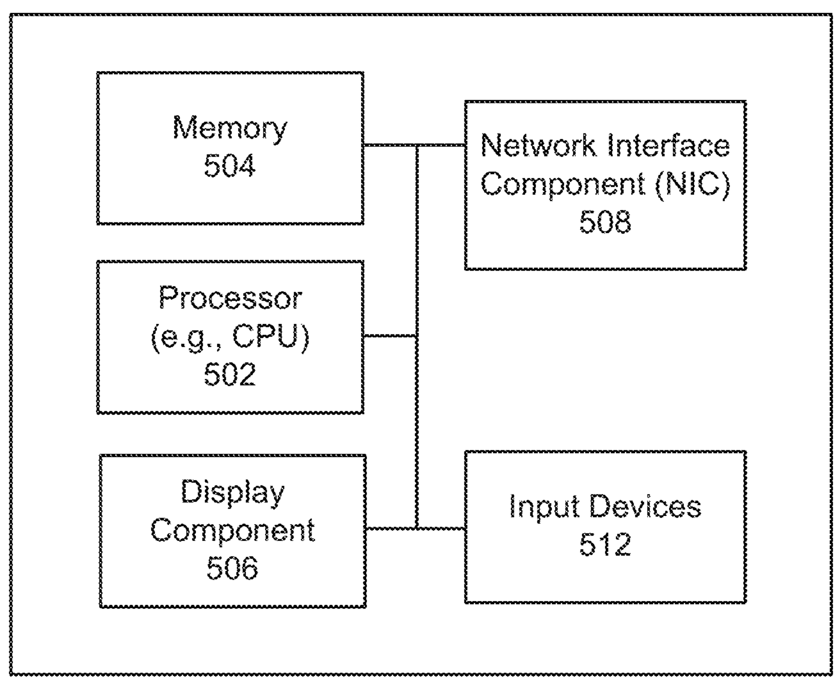
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in physical memory component 504. The memory component 504 can include many types of memory, data storage, or non-transitory computer-readable storage media, such as random access memory (RAM) storing program instructions for execution by the processor 502, a separate form of storage for images or data, a removable memory for sharing information with other devices and the like. The memory component 504 typically can further comprise a display component 506, such as a monitor, a touch screen, liquid crystal display (LCD), or the like. In various embodiments, the computing device will include at least one input device 512 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 508 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:

receiving an indication of a file that is to be backed up from an endpoint device to a central storage;

determining whether the file resides on at least a threshold number of source endpoint devices;

if the file does not reside on at least the threshold number of source endpoint devices, storing, in the central storage, indications of which source endpoint devices contain a copy of the file; and if the file resides on at least the threshold number of source endpoint devices, marking the file as being persistent and discontinuing the storing of the indications of which source endpoint devices contain the copy of the file, wherein files marked as persistent are restricted from being deleted in the central storage.

2. The method of claim 1, further comprising:

incrementing the number of source endpoint devices in response to receiving the indication of a file that is to be backed up from the endpoint device.

3. The method of claim 1, wherein receiving the indication of the file that is to be backed up from an endpoint device to the central storage further comprises:

receiving, from each of a plurality of endpoint devices to a central server, a manifest that identifies a listing of files located on said each endpoint device;

for each received manifest, inspecting the manifest received to the central server to determine which files need to be uploaded from the endpoint device to the central server in order to construct a full image of the endpoint device on the central server.

4. The method of claim 3, wherein the manifest includes a plurality of nodes, each node corresponding to a file on the endpoint device, the node comprising a path of the file, a size of the file and a hash value.

5. The method of claim 1, wherein the central storage maintains the file in a single instance store (SIS) that stores a single copy of each unique file.

6. The method of claim 5, wherein storing, in the central storage, indications of which source endpoint devices contain a copy of the file is performed using a reference counting process that comprises:

storing a pointer in a central virtual disk (CVD) of the endpoint device, wherein the pointer references the single copy of the file in the SIS;

when a file is deleted from the endpoint device, deleting the pointer from the CVD without deleting the file from the SIS, wherein the file is not deleted from the SIS until a last pointer referencing the file is deleted.

7. The method of claim 6, wherein upon marking the file as being persistent, the reference counting process is discontinued.

8. A central server computing device, comprising:

at least one processor; and memory including instructions that, when executed by the at least one processor, cause the computing device to:

receive an indication of a file that is to be backed up from an endpoint device to a central storage;

determine whether the file resides on at least a threshold number of source endpoint devices;

if the file does not reside on at least the threshold number of source endpoint devices, store, in the central storage, indications of which source endpoint devices contain a copy of the file; and if the file resides on at least the threshold number of source endpoint devices, mark the file as being persistent and discontinue the storing of the indications of which source endpoint devices contain the copy of the file, wherein files marked as persistent are restricted from being deleted in the central storage.

9. The computing device of claim 8, the memory further comprising instructions that, when executed by the at least one processor, cause the computing device to:

increment the number of source endpoint devices in response to receiving the indication of a file that is to be backed up from the endpoint device.

10. The computing device of claim 8, wherein receiving the indication of the file that is to be backed up from an endpoint device to the central storage further comprises:

receiving, from each of a plurality of endpoint devices to a central server, a manifest that identifies a listing of files located on said each endpoint device;

for each received manifest, inspecting the manifest received to the central server to determine which files need to be uploaded from the endpoint device to the central server in order to construct a full image of the endpoint device on the central server.

11. The computing device of claim 10, wherein the manifest includes a plurality of nodes, each node corresponding to a file on the endpoint device, the node comprising a path of the file, a size of the file and a hash value.

12. The computing device of claim 8, wherein the central storage maintains the file in a single instance store (SIS) that stores a single copy of each unique file.

13. The computing device of claim 12, wherein storing, in the central storage, indications of which source endpoint devices contain a copy of the file is performed using a reference counting process that comprises:

storing a pointer in a central virtual disk (CVD) of the endpoint device, wherein the pointer references the single copy of the file in the SIS;

when a file is deleted from the endpoint device, deleting the pointer from the CVD without deleting the file from the SIS, wherein the file is not deleted from the SIS until a last pointer referencing the file is deleted.

14. The computing device of claim 13, wherein upon marking the file as being persistent, the reference counting process is discontinued.

15. A non-transitory computer readable storage medium comprising one or more sequences of instructions, the instructions when executed by one or more processors causing the one or more processors to execute the operations of:

receiving an indication of a file that is to be backed up from an endpoint device to a central storage;

determining whether the file resides on at least a threshold number of source endpoint devices;

if the file does not reside on at least the threshold number of source endpoint devices, storing, in the central storage, indications of which source endpoint devices contain a copy of the file; and if the file resides on at least the threshold number of source endpoint devices, marking the file as being persistent and discontinuing the storing of the indications of which source endpoint devices contain the copy of the file, wherein files marked as persistent are restricted from being deleted in the central storage.

16. The non-transitory computer readable storage medium of claim 15, further comprising instructions for:

incrementing the number of source endpoint devices in response to receiving the indication of a file that is to be backed up from the endpoint device.

17. The non-transitory computer readable storage medium of claim 15, wherein receiving the indication of the file that is to be backed up from an endpoint device to the central storage further comprises:

receiving, from each of a plurality of endpoint devices to a central server, a manifest that identifies a listing of files located on said each endpoint device;

for each received manifest, inspecting the manifest received to the central server to determine which files need to be uploaded from the endpoint device to the central server in order to construct a full image of the endpoint device on the central server.

18. The non-transitory computer readable storage medium of claim 15, wherein the central storage maintains the file in a single instance store (SIS) that stores a single copy of each unique file.

19. The non-transitory computer readable storage medium of claim 18, wherein storing, in the central storage, indications of which source endpoint devices contain a copy of the file is performed using a reference counting process that comprises:

storing a pointer in a central virtual disk (CVD) of the endpoint device, wherein the pointer references the single copy of the file in the SIS;

when a file is deleted from the endpoint device, deleting the pointer from the CVD without deleting the file from the SIS, wherein the file is not deleted from the SIS until a last pointer referencing the file is deleted.

20. The non-transitory computer readable storage medium of claim 19, wherein upon marking the file as being persistent, the reference counting process is discontinued.

* * * * *